(12) United States Patent
Kline et al.

(10) Patent No.: US 7,266,283 B2
(45) Date of Patent: Sep. 4, 2007

(54) FIBER OPTIC STORING AND DISPENSING APPARATUS

(75) Inventors: James R. Kline, Petosky, MI (US);
Thomas J. Kline, Petosky, MI (US);
Dustin S. Sene, Emigrant, MT (US)

(73) Assignee: Fiber Optic Cable Storage, Inc., Tampa, FL (US)

( * ) Notice: Subject to any disclaimer, the term of this patent is extended or adjusted under 35 U.S.C. 154(b) by 245 days.

(21) Appl. No.: 11/081,190

(22) Filed: Mar. 16, 2005

(65) Prior Publication Data
US 2006/0210230 A1    Sep. 21, 2006

(51) Int. Cl.
*B21C 47/02*    (2006.01)
(52) U.S. Cl. ....................... 385/137; 242/362
(58) Field of Classification Search ................. 385/137
See application file for complete search history.

(56) References Cited

U.S. PATENT DOCUMENTS 6,533,205 B1 *   3/2003   Kles ........................... 242/362
6,554,217 B1 *   4/2003   Rodriguez ................... 242/362
7,120,349 B2 *  10/2006   Elliott ........................ 385/137

\* cited by examiner

*Primary Examiner*—Frank G. Font
*Assistant Examiner*—Mary El-Shammaa
(74) *Attorney, Agent, or Firm*—John K. McCulloch

(57) ABSTRACT

Storage and dispensing apparatus for use with a unitary length of coilable fiber optic cable having a minimum bending radius, such apparatus having a casing within which is journaled a rotatable spool having two grooves in which relatively long and relatively short lengths of the cable may be coiled. One end of the cable is coupled to a connector that is releasably retained on the spool for rotation therewith. The opposite end of the cable is joined to a connector which is extendible from and retractable into the casing in which the spool is journaled. The casing is formed of rigid plastic material which protects the cable against damage from externally applied forces. No part of the cable within the casing is subject to being bent about a radius less than the minimum bending radius.

24 Claims, 5 Drawing Sheets

FIBER OPTIC STORING AND DISPENSING APPARATUS

This invention relates to apparatus for storing and dispensing coilable material, such as a fiber optic cable, in and from a protective casing.

BACKGROUND OF THE INVENTION

When installing, testing, maintaining, or tuning all ranges of fiber optic networks it is necessary to use various test sets. A test set ordinarily will include one or more fiber optic jumper cables for verifying the integrity of signal flow through various parts of the fiber optic circuit. The length of the fiber optic jumper cable depends on the distance that must be spanned by such cable.

A fiber optic jumper cable used for testing purposes in the field conventionally is accommodated for shipment in a transparent, flimsy, plastic storage bag. Conventionally, a jumper cable is wound about a radius of two inches or more to form a coil which is placed in the plastic bag without any additional protection against damage from externally applied forces, such as that resulting from being stepped on or struck by falling objects. The storage of a fiber optic cable in a flimsy plastic bag is undesirable because of the susceptibility to damage of such cable while accommodated in such bag.

A fiber optic jumper cable has certain known physical and optical characteristics, such as the cable diameter and its signal transmissivity attenuating properties. The attenuating properties usually are determined at about the time the cable is coiled without signal affecting bends for packaging, whereas the diameter of the cable determines the minimum radius about which the cable may be bent or wound to ensure against damaging the cable. These characteristics may be embraced by the term "minimum bending radius" which, as used herein, means the minimum radius about which a cable may be bent without subjecting the cable to physical damage or any appreciable loss of signal transmissivity.

When a field engineer extracts a coiled fiber optic jumper cable from the bag in which it is stored, it is common for the engineer to discard the plastic bag and manually uncoil and recoil the cable prior to and following its use. Manual uncoiling of the cable frequently causes the cable to become twisted or kinked, whereas manual recoiling of the cable subjects it to the possibility that it will be wound about a radius less than the minimum bending radius, thereby physically damaging the cable and adversely affect its ability to transmit an optical signal without undue attenuation.

In those instances in which the test set and a fiber optic jumper cable are shipped or stored in the same container, the cable is exposed to the possibility of damage by the test equipment itself.

The distance from the test set to the equipment under test varies in different testing environments. The current practice, therefore, requires the selection of a length of cable, which almost always is greater than the distance to be spanned, thereby resulting in excessive sagging of the cable between its ends and requiring the cable, after use, to be recoiled by hand resulting in uncertain bending radii and increasing the risk of damaging the cable.

A principal object of the invention is to provide apparatus which overcomes these disadvantages.

SUMMARY OF THE INVENTION

Apparatus constructed in accordance with the invention comprises a casing formed of rigid plastic material defining a hollow housing within which a unitary length of coilable material, such as a fiber optic cable, is supported for extension from and retraction into the housing. Within the housing is a spool about which the cable may be wound. The spool is mounted for rotation about an axis and has therein an annular, relatively deep primary groove and a secondary, relatively shallow groove alongside the primary groove. Accommodated in the primary groove is a coiled, relatively long length section of the cable, and accommodated in the secondary groove is a coiled, relatively short length of the same cable. The spool is rotatable about the axis of rotation by means of a crank and the rotation of the crank is transmitted to the spool by a geared transmission. The radius about which the cable is coiled is no less than the minimum bending radius of the cable, and no part of the cable is subjected to bending about a radius less than the minimum bending radius.

The grooves are formed by axially spaced apart side-by-side flanges, one of which is common to both grooves. An intermediary portion of cable passes from the primary groove in the spool to the secondary groove via a lateral passage adjacent the center of the spool and is guided in its transition between the grooves in such manner as to avoid kinking, twisting, or otherwise damaging the cable.

The cable has two opposite free ends at each of which is secured a fitting or connector. One connector passes through an aperture in the casing so as to enable a desired length of the cable in the primary groove of the spool to be unwound therefrom and extended from the casing a substantial distance. The second connector at the opposite end of the cable removably may be retained at one side of the spool by a retainer. The length of the cable section that extends from the axis of rotation of the spool to the second connector may be substantially less than that of the other section of the cable.

The casing preferably includes a pivoted door which may be opened and closed so as to enable that portion of the cable wound about the secondary spool groove to be accessed conveniently. When the door is closed, all of the parts within the casing, including both of the cable sections wound on the spool, will be protected by the casing against damage from external forces.

THE DRAWINGS

The presently preferred embodiment of the apparatus is illustrated in the accompanying drawings wherein.

THE PREFERRED EMBODIMENT

Figure 1:
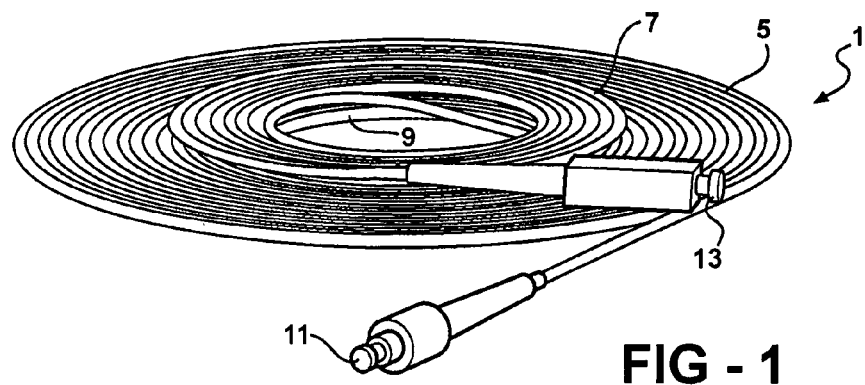
FIG. 1 is a an enlarged, isometric view of a typical fiber optic cable wound in such manner as to provide two coiled sections of different lengths, one of such coils overlying the other.
Figure 2:
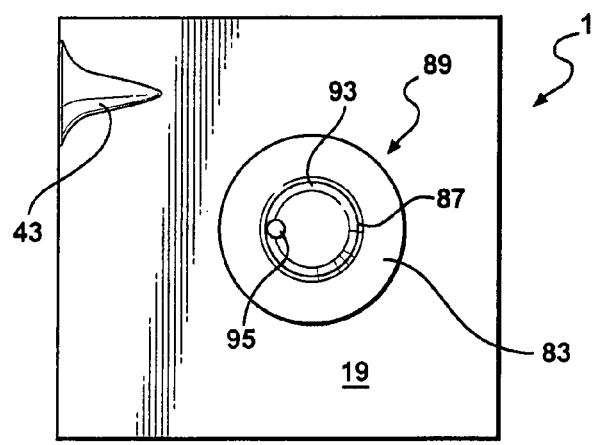
FIG. 2 is a plan view of a casing in which the coiled cable may be stored.
Figure 3:
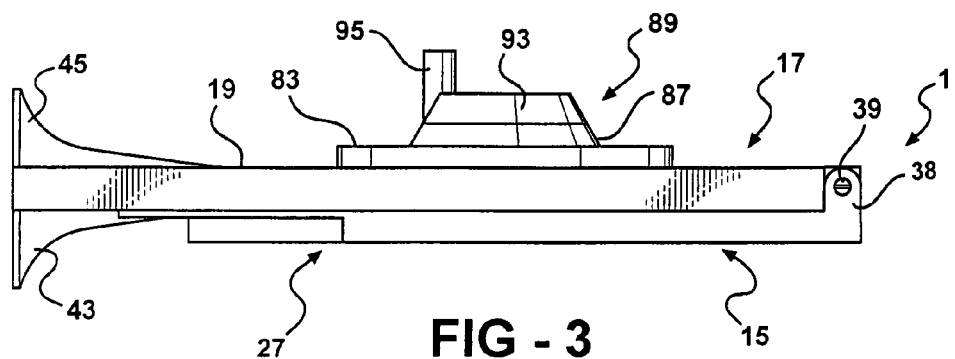
FIG. 3 is a reduced scale side elevational view of the casing.
Figure 4:
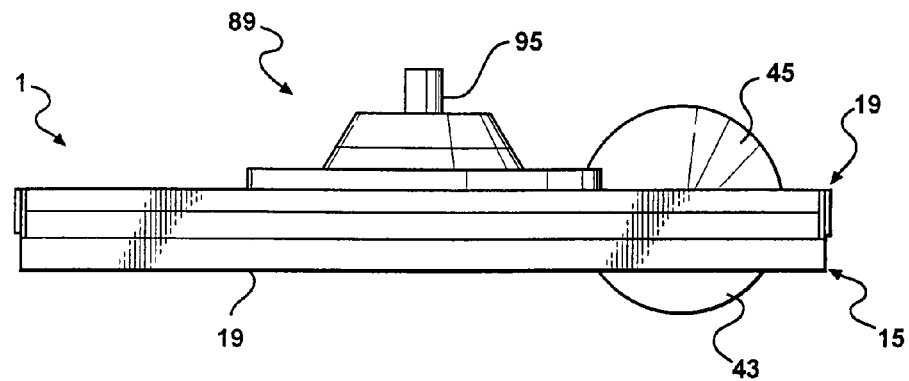
FIG. 4 is a view similar to FIG. 3, but with the casing rotated through 90°.
Figure 5:
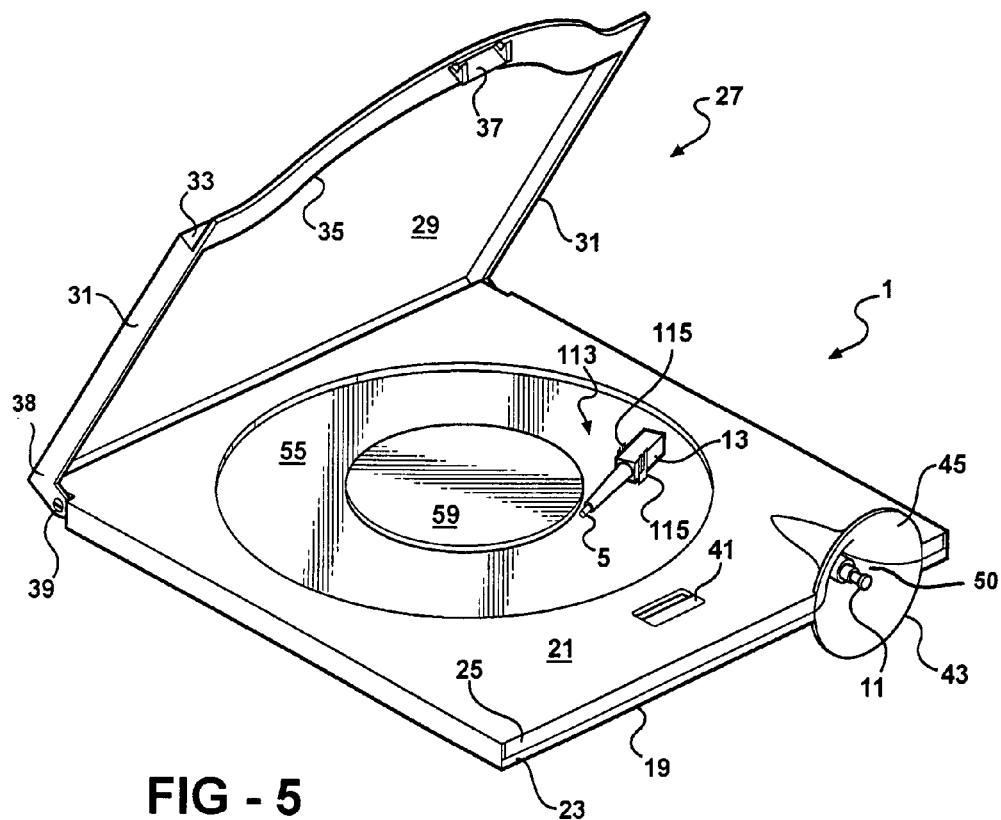
FIG. 5 is an isometric view of the casing illustrating an access door in an open position, but omitting most of the cable.
Figure 6:
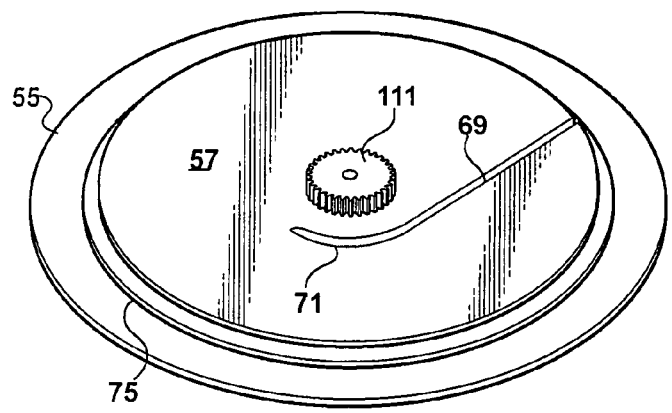
FIG. 6 is an isometric view illustrating one side of a spool on which the cable may be wound.
Figure 7:
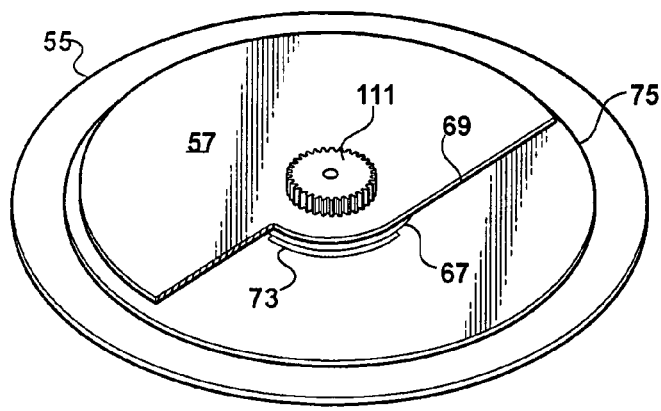
FIG. 7 is a view similar to FIG. 6, but with parts broken away for clarity of illustration.
Figure 10:
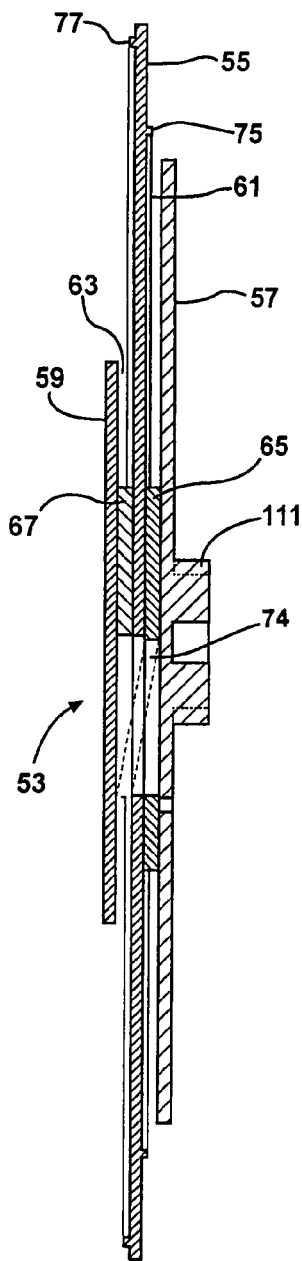
FIG. 10 is an enlarged, vertical sectional view through the spool.
Figure 8:
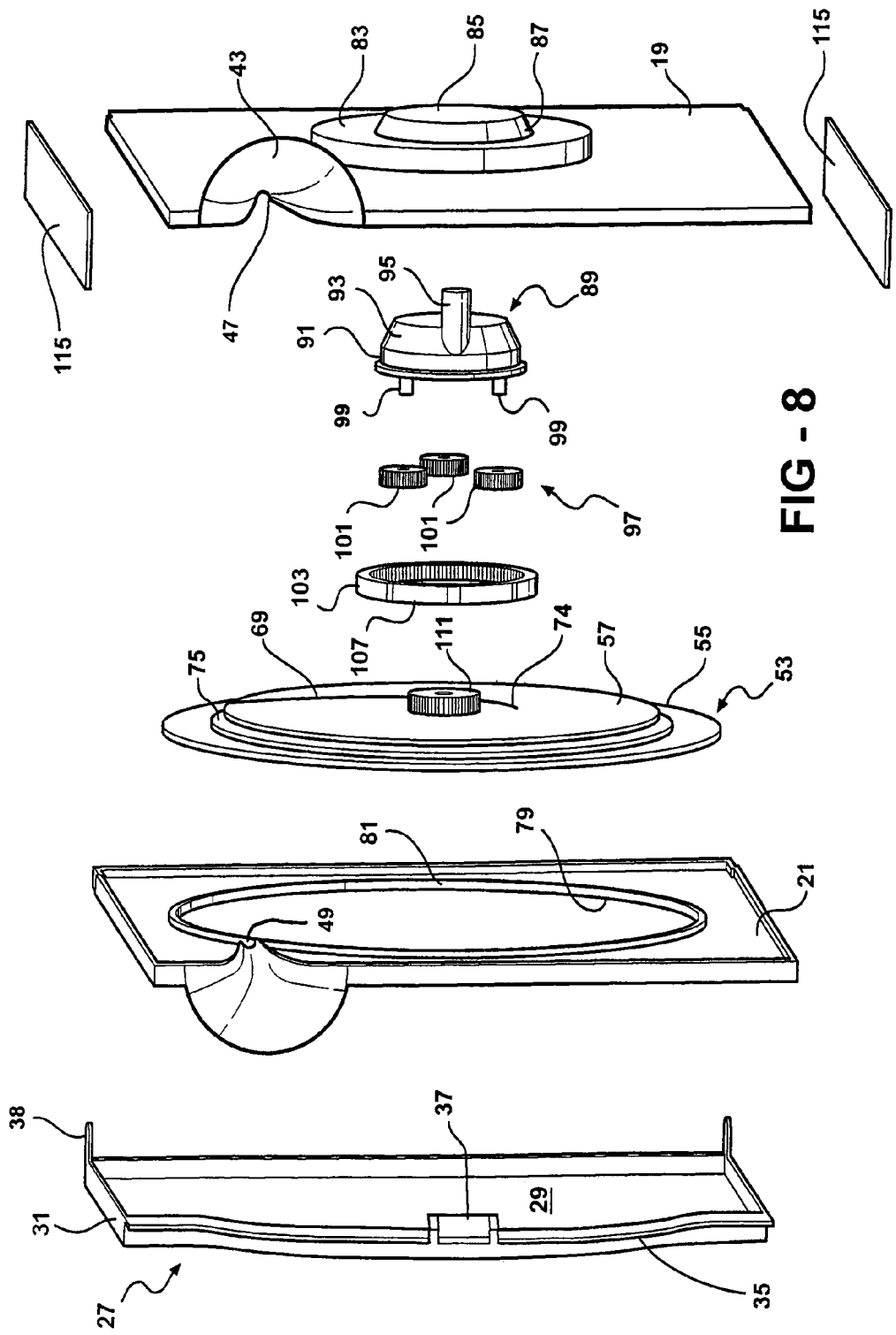
FIG. 8 is an isometric, exploded view of the apparatus as viewed in one direction.
Figure 9:
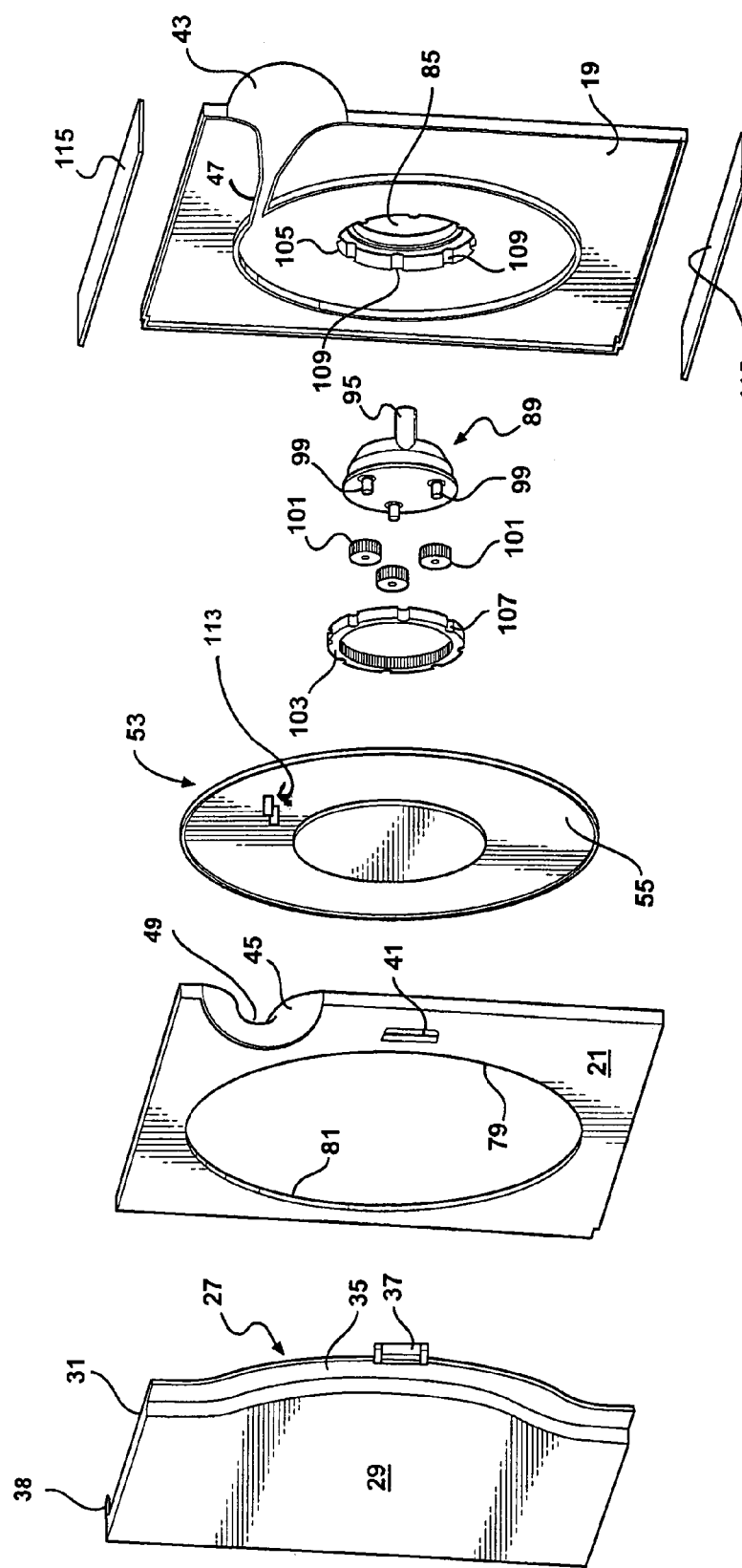
FIG. 9 is a view similar to FIG. 8, but showing the apparatus from another direction.

Apparatus constructed in accordance with the presently preferred embodiment of the invention comprises a casing 1 formed from rigid plastic material, such as polycarbonate or that used in the manufacture of so-called jewel cases for compact discs and the like. The casing is adapted to contain a selected length of coilable material, such as a conventional, cladded fiber optic cable 3. As shown in FIG. 1 the cable 3 is a single, unitary cable having two coil sections 5 and 7 each of which is wound about a radius at least as great as the minimum bending radius of the cable. The section 5 has a length greater than that of the section 7. The longer section 5 sometimes will be referred to herein as the primary section and the shorter section 7 as the secondary section. The cable includes an integral intermediate section 9 which forms a transition between the sections 5 and 7. At one free end of the cable 3 is fixed a conventional fitting or connector 11 and at the opposite The casing has parallel panels 15 and 17 which confront one another and form a hollow housing. The two panels have overlying, parallel, spaced apart walls 19 and 21. The walls include confronting flanges 23 and 25 which ultimately are welded or otherwise suitably secured to one another so as to establish and maintain the spacing of the panel walls 19 and 21 from one another. A cover 27 (best shown in FIG. 5) has a planar wall 29 having side flanges 31 and an end flange 33 which is joined to a planar flange 35 provided with a springy latch 37. The side flanges 31 have fingers 38 provided with openings for the accommodation of pivot pins 39 carried by the wall 21. The wall 21 also has a latch keeper 41 for the removable accommodation of the latch 37. The arrangement is such that the cover 27 may be swung about the pivot pins 39 from an open position as shown in FIG. 5 to a closed and latched position, as is shown in FIGS. 2-4.

The walls 19 and 21 are provided with overlying, circumferential, arcuate sections 43 and 45 and grooves 47 and 49, respectively, which together form an inwardly tapering, bell-shaped inlet/outlet passage 50 in communication with the interior of the housing. The arcuate sections 43 and 45 are formed on radii which are no less than the minimum bending radius of the cable.

The apparatus includes a spool 53 on and from which the cable 3 may be wound and unwound. The spool has three axially spaced, side-by-side circular flanges 55, 57, and 59, the flange 55 being sandwiched between the flanges 57 and 59 in spaced relation so as to form two axially spaced annular grooves 61 and 63 for the accommodation of different sections of the cable 3. Between the flanges 55 and 57 and adjacent the centers thereof is a circular hub section 65 and between the flanges 55 and 59 is a corresponding hub section 67. The hub sections form the axis of rotation of the spool and also form the minimum radius about which the respective coil sections are wound, and such radius is at least as great as the minimum bending radius of the cable.

Since the diameter of the flange 57 is greater than that of the flange 59 the groove 61 has a depth greater than that of the groove 63. The spool flange 57 has an abbreviated, substantially chordal slot 69 which extends inwardly from the peripheral edge and terminates in an arcuate guide slot section 71 which is formed on a radius corresponding to that of the hub 65. The slot section 71 overlies an arcuate slit 73 formed in the center flange 55 adjacent the hub 67. The slit 73 thus provides communication between the grooves 61 and 63 via a lateral passage 74. The widths of the spool grooves, the slot 69, the slot 71, the slit 73, and the passage 74 are such as freely to accommodate the cable 3.

That face of the flange 55 which confronts the flange 57 has a circular stiffening rib 75, and that face of the flange 55 which confronts the flange 59 has a circular stiffening rib 77 adjacent the periphery of the flange 55.

The wall 21 of the casing has an opening 79 which provides access to the spool flange 59. The rib 77 on that face of the flange 55 which confronts the flange 57 bears against the casing wall 21 and also provides a bearing surface for the spool 53.

The wall 19 of the casing has an outwardly projecting chamber 83 at the center of which is an opening 85 encircled by a tapered journal flange 87. Accommodated in the chamber 83 is a cylindrical crank 89 having a body at one side of which is a disc 91 and a tapered bearing surface 93 which is accommodated in the tapered flange 87. The crank includes a handle 95 which extends through the opening 85 and beyond the casing wall a distance sufficient to enable an operator to rotate the crank by means of the handle 95.

Drive transmission means 97 is provided for transmitting rotation of the crank 89 to the spool 53. The transmission comprises three circumferentially spaced spindles 99 on which are journaled correspondingly spaced gears 101 which mesh with a ring gear 103 fitted into an opening 105 in the casing wall 19 which is concentric with the opening 85. The ring gear 103 has circumferentially spaced external notches 107 which accommodate correspondingly spaced projections 109 extending radially inwardly from the edge of the opening 105, thereby precluding rotation of the ring gear relative to the wall 19. The gears 101 also mesh with a gear 111 fixed on the flange 57 so as to rotate with the spool 53 about its axis of rotation.

On the face of the spool flange 55 is secured a retainer 113 comprising a pair of spaced apart, springy fingers 115 and between which the connector 13 at one free end of the cable 3 removably may be accommodated.

To condition the apparatus for operation, the free end of the shorter or secondary cable length 7, prior to attaching the connector 13 thereto, is introduced to the slot 71 in the spool flange 57 and thence extended through the lateral passage 74 formed by the slit 73. The deflection of the cable to enable it to extend through the passage 74 does not subject the cable to bending about a radius less than the minimum bending radius of the cable. The cable may be extended manually through the passage into and through the groove 63 until the intermediate cable section 9 occupies the passage 74. When the intermediate section 9 of the cable occupies the passage, that portion of the cable which has passed through the passage may be wound in the groove 63 to form the secondary coil section 7. Following the formation of the coil section 7 the connector 13 may be applied to the free end of the cable 3 and fitted into the retainer 113.

The longer length of the cable 3 then may be wound about the hub in the spool groove 61 to form the primary coil 5. The spool 53 then may be placed between the two casing halves with that portion of the cable 3 adjacent the connector 11 extending through the inlet passage 50 formed by the grooves 47 and 49. The casing halves then may be sonic welded or otherwise secured to one another with the connector 13 occupying a stored position in the passage 50 between the parts 43 and 45.

When it is desired to make use of the apparatus, the connector 11 may be withdrawn from the passage 50 and extended manually a desired distance from the casing. The extension of the connector 11 will cause some portion of the primary coil 5 to be unwound from the spool and the latter to rotate about its axis. The inlet passage 50 is so positioned that the movement of the cable through the inlet is along a path substantially tangential to the spool groove 61, thereby avoiding bending the cable about a radius less than the minimum bending radius. Further, the curvature of the surfaces 43 and 45 is on a radius which is no smaller than the minimum bending radius of the cable, thereby ensuring that the cable will not be damaged by being bent too sharply, even if the cable hangs freely from the exit end of the inlet passage 50.

During the unwinding of the cable from the primary coil 5 and the resulting rotation of the spool, the connector 13 at the opposite end of the cable will be retained in place on the spool flange 59 by the retainer 113. Although the entire spool 53 will rotate, there will be no twisting of the cable transition section 9 or any other part of the cable. Consequently, there will be no twisting or kinking of any part of the cable.

Following extension of the cable from the primary coil 5 a desired distance, the cover 27 may be moved to its open position so as to expose the connector 13. The connector may be removed from the retainer 113 and the adjacent part of the cable unwrapped manually from the secondary coil 7 via the spool groove 63 and extended the desired distance. The connectors 11 and 13 may be coupled to the power source (not shown) and the selected equipment unit (not shown).

It sometimes is convenient to mount the casing in a position other than upon the floor or ground. In many instances the junction box between the power source and the operating unit is formed of magnetically permeable metal. It is desirable, therefore, to adhesively apply magnetic strips 115 to opposite ends of the casing so as to provide a stable, removable support for the casing on the junction box or other magnetically permeable devices.

When the function of the jumper cable has been completed, the connector 13 at the free end of the cable section constituting the secondary coil 7 may be uncoupled from the unit to which it is connected, thereby enabling the cable to be rewound by hand in the groove 63 of the spool 53 while the spool remains stationary. When the secondary coil is fully rewound, the connector 13 may be returned to the retainer 113. The connector 11 then may be uncoupled from the unit to which it was coupled and the crank 89 rotated in such direction as to wind the longer length section of the cable in the spool groove 61 via the inlet passage 50. The gear transmission 97 illustrated is one which enables about a three to one ratio to be obtained between the crank and the spool. That is, for each revolution of the crank 89, the spool 53 will be rotated about three revolutions. This accelerates the return of the longer length cable section to the casing.

As the connector 11 at the free end of the longer length cable section approaches the casing, the cable will be guided by the arcuate parts 43 and 45 so as to prevent deflection or bending of the cable about an arc less than the minimum bending radius even if the cable is whipped as the connector 11 approaches the casing.

The casing is so constructed that, as the cable is supported within the casing and as it is extended from and retracted into the casing, no part of the cable is subjected to bending about a radius less than the minimum bending radius of such cable.

Although the description of the invention has been concerned primarily with a fiber optic cable, it will be understood that the invention is not limited to use with such a cable. Instead, the invention is operable with any coilable material.

The disclosed embodiment is representative of a presently preferred form of the invention, but is intended to be illustrative rather than definitive thereof. The invention is defined in the claims.

We claim:

1. Apparatus for storing and dispensing a unitary length of coilable material, said apparatus comprising means forming a casing; a spool having a hub; and means mounting said spool in said casing for rotation about an axis formed by said hub, said spool having a pair of side-by-side annular grooves therein for the accommodation of different sections of such coilable material, said spool having a lateral passage adjacent said hub in communication with both of said grooves, said grooves and said passage being of such width as freely to accommodate the respective sections of said coilable material.

2. The apparatus according to claim 1 wherein said spool has a plurality of spaced apart flanges carried by said hub and defining said grooves, one of said flanges having a diameter greater than that of any other of said flanges thereby enabling said grooves to have different maximum depths.

3. The apparatus according to claim 2 wherein said passage is formed by a slit extending through that flange which is between said grooves.

4. The apparatus according to claim 3 including a slot in that flange which is adjacent the flange in which said slit is formed, said slot being in communication with said slit.

5. The apparatus according to claim 1 wherein said coilable material comprises an elongate fiber optic cable having a first length section coiled in one of said grooves, a second length section coiled in the other of said grooves, and an intermediate section extending through said passage.

6. The apparatus according to claim 5 wherein said first length section has a length greater than that of said second length section.

7. The apparatus according to claim 6 including a fitting at each end of said cable, the fittings at the ends of said first and second length sections being extensible and retractable respectively relative to said casing in response to uncoiling of said first and second length sections from said spool and coiling said first and second length sections on said spool.

8. Apparatus for storing and dispensing a fiber optic cable of selected length and having a minimum bending radius, said apparatus comprising a spool having a hub; flanges carried by said hub forming a pair of side-by-side annular grooves; means mounting said spool for rotation about an axis, said spool having a lateral diagonal passage adjacent said hub in communication with both of said grooves; and an elongate, unitary fiber optic cable of selected length, a first length section of said cable being windable and unwindable in and from one of said grooves, a second length section of said cable being windable and unwindable in and from the other of said grooves, and an intermediate length section of said cable extending through said passage.

9. The apparatus according to claim 8 wherein said passage is adjacent said hub.

10. The apparatus according to claim 8 wherein said first length section is longer than said second length section.

11. The apparatus according to claim 8 wherein one of said grooves has a depth greater than that of the other of said grooves.

12. The apparatus according to claim 8 wherein no part of said cable within said casing is bent about a radius less than said minimum bending radius.

13. The combination of a unitary length of coilable material and a casing in which said material may be stored in coiled condition, said casing comprising a housing; a spool having a plurality of spaced flanges forming two side-by-side annular grooves, one of said flanges being common to both of said grooves; a hub extending laterally of said casing, said one of said flanges having a passage therethrough in communication with both of said grooves; and means mounting said spool in said casing for rotation about an axis extending through said hub, said coilable material having a first length section wound about said hub to form a first coil occupying one of said grooves, said coilable material having a second length section wound about said hub to form a second coil occupying the other of said grooves, said coilable material having an intermediate section between said first and second sections extending from one of said grooves to the other of said grooves via said passage, said casing having an inlet through which a selected portion of one of said length sections may pass from said first coil for extension from said casing, a selected portion of the other of said length sections being unwindable from the other of said grooves and from said second coil for extension from said casing.

14. The combination according to claim 13 including rotatable crank means; and gear transmission means coupling said crank means and said spool for rotating the latter in response to rotation of said crank means.

15. The combination according to claim 14 wherein said coilable material has a minimum bending radius and wherein said inlet has arcuate surfaces engageable by said coilable material, said arcuate surfaces being formed on a radius at least as great as said minimum bending radius.

16. The combination according to claim 13 wherein one of said length sections is longer than the other of said length sections.

17. The combination according to claim 16 wherein one of said grooves has a depth greater than that of the other of said grooves and wherein the longer length section is accommodated in the groove having the greater depth.

18. The combination according to claim 13 wherein one of said flanges has a peripheral edge from which a slot extends toward and communicates with said passage.

19. The combination according to claim 13 wherein each of said first and said second length sections has a free end, one of said flanges having retainer means for releasably retaining the free end of said other of said length sections.

20. The combination according to claim 13 wherein said coilable material has a minimum bending radius and wherein no part of said coilable material within said casing is bent on a radius less than said minimum bending radius.

21. Apparatus for storing and dispensing a unitary length of coilable material having opposite end sections joined by an intermediate section, said apparatus comprising means forming a rigid casing; a spool having a hub forming an axis of rotation for said spool; and means mounting said spool in said housing for rotation about said axis, said spool having a pair of axially spaced, side-by-side flanges forming side-by-side annular grooves for the accommodation of the respective end sections of such coilable material, said spool having a lateral passage adjacent said hub in communication with both of said grooves and through which salad intermediate section of such coilable material may extend, salad grooves and said passage being of such width as freely to accommodate the respective sections of said coilable material.

22. The combination according to claim 21 including rotatable crank means; and gear transmission means coupling said crank means and said spool for rotating the latter in response to rotation of said crank means.

23. The combination according to claim 21 wherein one of said flanges has a peripheral edge from which a slot extends toward and communicates with said passage.

24. The combination according to claim 21 wherein each of said first and said second length sections has a free end, one of said flanges having retainer means for releasably retaining the free end of said other of said length sections.

* * * * *

UNITED STATES PATENT AND TRADEMARK OFFICE
CERTIFICATE OF CORRECTION

PATENT NO. : 7,266,283 B2 Page 1 of 1
APPLICATION NO. : 11/081190
DATED : September 4, 2007
INVENTOR(S) : James R. Kline, Thomas J. Kline and Dustin S. Sene It is certified that error appears in the above-identified patent and that said Letters Patent is hereby corrected as shown below:

Column 8, line 22 and 23 (claim 21), change "salad" both occurrences to -- said --.

Signed and Sealed this

Twentieth Day of November, 2007

JON W. DUDAS
*Director of the United States Patent and Trademark Office*